(12) United States Patent
Stach et al.

(10) Patent No.: US 8,092,903 B2
(45) Date of Patent: Jan. 10, 2012

(54) SHAPED BODIES MADE OF POWDERS OR GRANULATED METAL, METHOD FOR THE PRODUCTION THEREOF AND THEIR USE

(75) Inventors: Helmut Stach, Prieros (DE); Peter Muenn, Berlin (DE); Jan Mugele, Berlin (DE)

(73) Assignee: PBB GbR, Berlin (DE)

( * ) Notice: Subject to any disclaimer, the term of this patent is extended or adjusted under 35 U.S.C. 154(b) by 1243 days.

(21) Appl. No.: 11/632,152

(22) PCT Filed: Jul. 9, 2004

(86) PCT No.: PCT/DE2004/001535
§ 371 (c)(1),
(2), (4) Date: Mar. 14, 2007

(87) PCT Pub. No.: WO2006/005275
PCT Pub. Date: Jan. 19, 2006

(65) Prior Publication Data
US 2007/0251837 A1 Nov. 1, 2007

(51) Int. Cl.
*B32B 3/26* (2006.01)
*B29C 44/04* (2006.01)

(52) U.S. Cl. .............. 428/305.5; 428/307.7; 428/307.3; 428/312.6; 428/312.8; 428/314.2; 428/317.9; 264/45.1; 264/45.3; 264/46.4; 264/46.6; 264/259; 264/267; 156/383; 210/484; 502/64; 502/400; 206/0.7

(58) Field of Classification Search .................. None
See application file for complete search history.

(56) References Cited

U.S. PATENT DOCUMENTS

| | | | |
|---|---|---|---|
| 3,400,181 A | 9/1968 | Battista et al. |
| 4,248,737 A | 2/1981 | Kulprathipanja |
| 4,420,419 A | 12/1983 | Ogawa et al. |
| 4,479,364 A | 10/1984 | Maier-Laxhuber |
| 4,499,208 A | 2/1985 | Fuderer |
| 4,619,948 A | 10/1986 | Kennedy et al. |
| 4,742,040 A | 5/1988 | Ohsaki et al. |
| 4,748,082 A | 5/1988 | Doerr et al. |
| 4,791,082 A | 12/1988 | Doerr et al. |
| 4,857,243 A | 8/1989 | Von Bluecher et al. |
| 4,886,769 A | 12/1989 | Kuma et al. |
| 6,074,972 A | 6/2000 | Bratton et al. |

FOREIGN PATENT DOCUMENTS

| | | |
|---|---|---|
| DE | 1 5367 491 | 4/1969 |
| DE | 2057 971 | 7/1971 |
| DE | 30 22 008 | 12/1980 |
| DE | 30 15 439 | 10/1981 |
| DE | 32 07 656 | 8/1983 |
| DE | 33 12 639 | 10/1983 |
| DE | 206 330 | 1/1984 |

(Continued)

*Primary Examiner* — Ling Xu
(74) *Attorney, Agent, or Firm* — Jordan and Hamburg LLP

(57) ABSTRACT

A shaped body, particularly a sorbent shaped body, made of microporous and mesoporous adsorbents and of composite adsorbents is provided for, which shaped body employs a reduced proportion of binding agents. The binding agent added to the shaped body solidifies under the application of force, under which force non-uniformly distributed cavities are formed. The proportion of binding agent on the support forming the wall of the shaped body is higher than the proportion of binding agent inside the shaped body. By using modified alumosilicates and/or aluminum silicates with fluidic action during materials exchange and heat exchange, the shaped body provides for high space-time yields while storing heat and cold.

31 Claims, 3 Drawing Sheets

FOREIGN PATENT DOCUMENTS

| | | |
|---|---|---|
| DE | 33 12 875 | 11/1984 |
| DE | 35 10 209 | 9/1986 |
| DE | 36 00 628 | 7/1987 |
| DE | 38 19 727 | 3/1989 |
| DE | 42 38 878 | 5/1993 |
| DE | 42 28 433 | 3/1994 |
| DE | 43 05 264 | 8/1994 |
| DE | 44 33 120 | 3/1995 |
| DE | 44 38 084 | 5/1996 |
| DE | 197 34 887 | 3/1999 |
| DE | 103 01 099 | 7/2004 |
| EP | 0 140 380 | 5/1985 |
| GB | 1 132 782 | 11/1968 |
| GB | 1290734 * | 9/1972 |
| GB | 1 398 466 | 6/1975 |

* cited by examiner

SHAPED BODIES MADE OF POWDERS OR GRANULATED METAL, METHOD FOR THE PRODUCTION THEREOF AND THEIR USE

BACKGROUND OF THE INVENTION

The invention relates to a method for the production of shaped bodies from powders and/or granules, in particular of sorbent shaped bodies comprising micro- or mesoporous adsorbents and of composite adsorbents that are used to store useful heat and useful cold, by which vaporous materials are expelled from the sorbent shaped bodies by application of heat energy and can be condensed where it is appropriate. The materials that were vaporized will be adsorbed in gas phase on corresponding sorbent shaped bodies.

Sorbent shaped bodies can be coated, stacked or bundled to be used for adsorptive thermal energy storage with the help of, preferentially, water vapour. This can be used for instance in techniques of heating, and cooling/air conditioning, particularly by making use of natural thermal sources like terrestrial or solar heat. Possible applications of energy storage can exist everywhere where thermal energy must be available for temporary use periods, which should not happen to coincide with periods of heat generation or their accessibility. The economical scope of the application of sorbent shaped bodies, micro- or mesoporous sorbents, is to attain high space-time yields of the equipments by which the energy transformation, for instance that of heat storage, can be achieved. In this case, the external shape and the geometrical dimensions of the sorbent shaped bodies can be expediently adjusted to the corresponding equipment, for example, to the internal walls of the tube of heat accumulators.

According to the state of the art, silicate heat storage media is distinguished by micro- and mesoporous sorbents from which adsorbed water can be removed through heat without damage to their frameworks.

One can refer to the company's scripts "Baylith®—Information", among them "80.100—general product description", "81.503—Technical Properties" and "81.505—Features on technical application", Bayer-Werke Leverkusen, as well as on "Zeosorb Molecular Sieves", Chemie AG Bitterfeld Wolfen.

In the chemical technology, alumosilicate like zeolite that are subjected to catalytic modification processes are mainly employed for the achievement of high space-time yields (DE 44 33 120 A1). High heat storage can be gained through further modifications of such zeolite by exchanging the univalent cations in particular that of the first main group with multivalent cations preferably cations of the second main group. In the publication DE 33 12 875 A1, magnesium-containing zeolite granular materials are employed for the generation of useful heat and/or useful cold. Usual techniques employ appropriate activating components in a batch-process to achieve cation exchange for modification of silicate sorbents. According to another aspect of the state of the art, a deposition can be made to occur in a matrix of hydrophilic materials such as salt hydrates that are subjected to a reversible hydration. These are inert to temperature and are capable of sorption. Examples are given in DE 43 05 264 A1, in which calcium chloride is placed in a powder form zeolite (DE 43 05 264 A1) or in a silica gel (DE 197 34 887 A1). In the same way, the modification of pellets or pre-fabricated granular materials furnished with a binding agent can be possible.

As a general rule, synthetic sorbents adapted to intended functions, are available in a finely grained crystal form during generation thereof. Usually their crystal sizes do not exceed a maximum of 500 μm. However, to get effective heat storage in the apparatus, the bulk of crystals with defined gap volumes allow only limited flow-speeds of the vaporous materials. Conversely, sorbents shaped bodies that exhibit larger transport pores, cavities and fluidic tubes are already applied through which higher flow speeds of the vaporous materials are assured. The direct material and heat exchange process with respect to water vapour occurs in the pores of the sorbents.

The drawback of all of these model structures is that it is difficult to integrate the powder or the granule into shaped bodies, and therefore the granules must be fixed in the structure with an additional binding agent that is initially fluidic or pasty on a support. The binding agent remains a significant space-filling component of the shaped body that decreases the efficiency of the powders or granules particularly of the sorbents by locking the micropores.

The poor thermal conduction of the shaped bodies is also unfavourable, since they are made of insulating material mainly comprised of mineral components.

Shaped bodies with only lower firmness are attained by application of organic polymers as binding agents for activated charcoals like for instance that of phenol formaldehyde resins (GB 1 398 466 A), polyvinyl resins and polyacrylates. Polyurethane (U.S. Pat. No. 4,619,948 A, DE 35 10 209 A1) and lattices increase the firmness of shaped bodies only slightly. During the application of fluidic organic medias, the derivates of cellulose as matrix creators for activated charcoals and zeolite (GB 1 132 782 A, DE 30 22 008 A1, U.S. Pat. No. 4,742,040, DD of 206 330 B) will be at least soaked. The solidifying qualities of the binding agent are then perturbed.

Due to their higher temperature stability, inorganic binding agents that are resistant to deformation, such as, aluminium hydroxide hydrates, clays and silica gel, exhibit some advantages. By embedding the activated charcoals in silicic acid matrices (DE 30 15 439 A1) or aluminiumoxid hydrate matrices (U.S. Pat. No. 4,499,208) or bentonite (DE 15 67 491 A1) and special clays (metakaolinite; DE 33 12 639 A1), the binding agent locks the micropores of the adsorbent in high extent. Even during carbonation of a water-soluble pitch acid (DE 42 28 433 A1), the originated high stable and solid carbon matrix hinders those materials that are diffused in the micro- and meso-pores. As mentioned above, binding agent is ascribed to similar sorption qualities as the zeolite (DE 38 19 727 A1). However, an exclusion of a specific portion of sorption-active crystals during material or heat exchange processes as well as hindrance at inside and outside of the active-exchangeable surfaces during the exchange process will remain disadvantageous.

The use of already granulated or pelletized crystal's binding agent also leads to familiar disadvantages. Conversely, due to their larger geometric shapes there exist larger gap volumes which are advantageous for the fluidic guidance due to lower pressure loss. However, a permanent negative influence with regard to the material and heat conduction efficiency of the equipment is encountered. In this case granular materials binded with mineralized binding agents like silicic acid derivate or clays have advantages. These are sorption-active, and the binding agent negatively influences sorption ability of the granular materials only to a lower extent.

Furthermore there are sorbent shaped bodies known, which are provided with a fluid permeable wrappers made of ceramic or of metallic materials for a good material or energy exchange over the boundary walls (EP 0 140 380 A). In this case, the coating provides better structure stability against mechanical stress and overcomes some of the known drawbacks of the binding agents.

From the publication DE 42 38 878, it is known that the gas bubbles out of ceramic pouring-masses can be removed by the effect of a force field, for example through centrifugal equipment. In this way, hollow ceramic objects are produced in solid of revolution form. Models are applied that are soaked with a casting slip and pre-hardened thermally at low temperatures. However, an embedding of powders or granules in binding agents that can harden at low temperatures is not yet intended.

For heat storage by means of highly effective modified Alumo- and/or aluminum silicates, with lower hydrothermal stabilities, binding agents that harden under low temperatures are preferable without considerably decreasing the sorption ability. Although the desorption of the vaporous material in silicate storage media can occur desirably below 1000° C., for some active components of the sorbent shaped bodies approximately 200° C. temperature must be taken into account to get a complete desorption and a targeted higher cycle of restoration of the working capacity of the medium. The considerable loading alternations and the corresponding temperature change of about 150° C. has a durable influence on the long term binding ability of powders or granular materials into the sorbent shaped bodies. Therefore, structures of the porous sorbent support also must show a high stability. On the other hand, tensions due to temperature change are supposed to be intercepted from the stabilized walls for the sake of long stability of the shaped bodies.

Thus, the basic object of the invention is to eliminate the described drawbacks of the existing techniques.

SUMMARY OF THE INVENTION

This object is attained in accordance with the invention by providing shaped bodies that are obtained by placing the solid pre-mixed constituents, powder and/or modelled granules with binding agents (fluid or pasty components) of the shaped body onto a porous or perforated support. During the pre-solidifying of the binding agents, which ensues by the action of an external force field, non-uniformly distributed cavities arise in form of gap volumes. In a favoured direction of the force field, the porous wall of the shaped body depicts a higher proportion of binding agents than inside of the shaped body. The non-uniformly distributed cavities in the shaped body should be fixed either simultaneously or in a favourable direction of a given time following pre-solidifying of the walls and its inside region. According to another aspect of the invention, a powder and/or granules micro- or mesoporous adsorbents, as well as composite adsorbents, are used to form a shaped body sorbent so as to store useful heat and useful cold.

Surprisingly, it was found that in the inventive shaped bodies, in particular sorbent shaped bodies comprised of modified Alumo- and/or aluminium-silicates, the binding agent is decreased to a low level. Accordingly the binding agent can be applied in lower proportion. Furthermore, in accordance with the invention, the binding agents in the resultant shaped bodies are locally confined and found preferentially in the peripheral zones, where they are important for the maintaining of the stability of the shaped body, so as to make its effects absolutely necessary.

Moreover, measures are intended to improve the way of material- and heat flows within the sorbent shaped bodies. An improvement will be achieved with respect to heat- and/or cold storage on the inventive sorbent shaped bodies as a result of increment of the sorption capacity and enlargement of the energy storage densities.

Based on the invention, one can achieve a distribution of the binding agent of the sorbent shaped bodies found between granules before or during its structural pre-solidification. The single components of inventive sorbent shaped bodies are:

Sorbing silicate powders or modelled sorbing granules in sphere, cylinder or a geometrical form deviating from these, Where appropriate, fine fibrous and/or fine dispersed metal components whose dimension is in millimeter region. This is above the size of the silicate crystal, however below the basic dimension of the granules, Where appropriate, additionally deformed stripes, fiber- or film like components out of metals or other heat conductive materials, whose basic dimensions are above that of the granules, At least one binding agent, on preferably silicate pre-polymerized base, like on water glass basis, Where appropriate, proportional wetting agent and/or binder for the components of the shape body in the binding agent.

According to the method of the invention, the shaped bodies are obtained by placing solid constituents thereof that are dryly premixed onto a porous or perforated support. The effect of an external force field below the support, at least in form of gravitational force or low pressure, is similar to a separation process of liquid out of solid materials through filtration. The basic dimensions of the shaped body are determined considerably by two main expansions of the support to which a small basic expansion is oriented to the direction of normal to a plane. The fluidic and low viscous binding agent is added, and it penetrates the entire gap volumes. In the direction of the force field, a density stratification of the binding agent is generated, by which one part of the binding agent diffuses stepwise through the support and is disconnected. The support is binded with the powder and/or with the granules through the still pasty or at least pre-solidified binding agent. In this way the powder and/or the granules is placed on a porous flat surfaced wall. The gap volume is favourably adjusted in the way that it is directed normal to the effect of the force field, which prefers to exit within the two basic expansions of the shaped body that is two-dimensional plainly oriented and is free to flow.

In the modified method, the solid premixed components are placed into a hollow-form of a stationary centrifuge whose walls are either porous or perforated. This hollow tube corresponds with the shape and the dimensions of the desired shaped body in large extent. The fluidic and low viscous binding agent is added and it penetrates the entirety of the gap volumes. Finally, the density stratification of the binding agent is achieved by the centrifugal effect. In this way, the powder and/or the granules are placed onto a rotationally symmetric porous wall. A freely fluidic gap volume is favourably adjusted so that it is normal to the effect of the force field and is directed radially with respect to the shaped body.

The adjusted fluidic gap volumes correspond approximately to that of the bulk powder or disordered bulk granules. The larger part of the binding agent is removed through the openings of the porous or perforated support or the periphery of the hollow tube as a result of the force field, so that favourable transport pores can be created. In both kinds of methods, the process of pre-solidification is initiated through thermal and/or chemical treating of the binding agent. The pre-solidified model is taken and subjected to a final thermal processing.

According to the invention, it is found that the distribution of the binding agent in the shaped body in the third and the smaller basic dimension is exponential, or it shows a radial uniform exponential deviation. Physical effects are used favourably so as to make the force of liquid surface tension at the network of solid materials and in cavities coupled with the capillary forces in columns, and also the corresponding split flow, which form common equilibrium forces. A higher part of the binding agent appears at the lower boundary of the smaller basic dimension or in the peripheral neighbouring areas of the shaped body. Correspondingly, lower binding agent appears at the upper boundary or in axial neighbouring regions of the shaped body. Simultaneously, the gap volumes have been reduced at the boundaries of the smaller basic dimension or in the peripheral areas, by which the binding strength between the powder or granules with the support and the remaining solid components is increased through formation of more bridges. Filling the available portion of the pores can also increase this effect. A stable and mechanically more strain resistant coating region of the shaped body arises at one side in a boundary wall that is oriented to the direction of the initial effect of the force field. Concomitantly, the proportion of the binding agent is reduced in the direction of the lower basic dimension or in the axial neighbouring areas. The binding agent is applied whereby it penetrates in the areas with higher force of interface that results to binding forces. It baked preferentially at the points of contact of crystals and granules by which the space between the solid components is only partially filled.

The chemical treatment of the binding agent can occur either during the partial separation of the extra binding agent or during the insertion of the binding agent pre-solidifying fluid through force field effect into the components of the shaped body. This can be carried out for water glass-like binding agents through acids or bases, which speeds up a polymerization and condensation of the available silicate functional groups. For other silicate based binding agents that have pre-solidifying ability, this can be achieved through the application of other flowing and reactive components to result in pre-polymerization.

The plain edge or peripheral area of the shaped body can also be restricted with the additional coatings, due to soaked binding agent, that are placed either onto the surface of the support or in the hollow tube of the centrifuge ahead of the centrifuging process. The coatings can be comprised of one or more layered knitted fabrics, tresses, fleeces, fibrous web or clutch and are preferentially metallic corresponding to the improvement of the heat conduction. Also, tresses or grating-like or other coatings provided with perforation are also intended. Additional heat-conducting solid materials can also be introduced for the formation of sorbent shaped bodies. These are consisted preferentially of thin fibrous or finely dispersed metal components that lie in the sub millimeter region of the bulk powder or below the basic measurement of the granules. They increase the thermal conductivity between sorbents and the binding agent, however mainly in the areas of the single and neighbouring granules. Deformed stripe-, fiber- or film-like components of metals or other heat-conductive materials, whose basic dimensions lie above those of the granules, can also be brought into the sorbent shaped bodies. These overtake the conduction over larger areas of the geometrical expansion and are, to a great extent important, particularly for sorbent shaped bodies.

Furthermore, it is possible to insert locally limited flow guidance into the sorbent shaped bodies that are comprised of materials which have grid- or grating-like transparency and are permeable to fluid. It can also be consisted of other perforated preferably metallic materials. In this way, the material exchange as well as the heat conduction can be improved. Their material proportion in shaped bodies during its production can be low; in order to keep the proportion of the binding agent lower that is adhered at this material in spite of the permeable pores for binding agent. The pre-solidification of the binding agent occurs simultaneously with pre-heating of the model. The appropriate pre-heating temperature for water glass containing binding agent lies below 200° C. The temperature at 150° C. is found to be preferred so that no damage is to be expected in particular for the modified alumosilicates and/or aluminium silicates.

In accordance with the values obtained for steam loading of the sorbent, for example, the integral heat of adsorption and energy density, favourable effects on heat storage are achieved when alumosilicates and/or mesoporous alumosilicates with a Si/Al ratio of at least from 1-4 and 15-30 are applied respectively. The alumosilicates are favoured through cation exchange modified zeolite with an average of pore radius below 7.2 nm. The exchanged cations are at least doubly positively charged. The total number of the cations is decreased in the accessible sorbens volumes due to partial separation of the sodium ions.

Unlike the actual state of knowledge, there is no or very insignificant change in the lattice structures of the non-modified and modified active components of the sorbent shaped bodies during the loading and un-loading processes of a heat storage under higher temperature. In this way, special positive effects can be achieved, for example, higher effectiveness and longer lifetime.

It is furthermore advantageous, when the active components are comprised of composite adsorbents, so that inserting of finely dispersed hydrophilic salts into their pores and cavities or onto the inside and outside surfaces of a sorbent support can be made possible.

The advantages of the sorbent shaped body in accordance with the invention is thus an optimal and possible combination of the reaction efficiency of modified alumosilicates and/or aluminum silicates with their fluidic action during the material and heat exchange. The scope is then to achieve high space-time yields while storing useful heat and useful cold.

The method is not limited only to the production of sorbent shaped bodies. Other shaped bodies, for instance those containing non-adsorbing granules can be produced in the same or similar way through the processes involving the action of force field by partial removal of the binding agent. In this way, sinter-like fused shaped bodies are developed from coarse dispersed granules that are characterized favourably by lower proportion of binding agent and higher gap volumes. The walls are strengthened by the higher and solidified part of the binding agents.

Both the single and a combination of several of the features described herein in accordance with the invention represent a favourable method for which a protection is applied through this publication.

The nature of the invention resides in a combination of known (Shaped bodies out of powders and/or granules, binding agents, etc.) and new elements (the production of the shaped bodies through the effect of a force field). They are mutually influential, and demonstrate a new entire effect on their application positively, and the strived success, which is to achieve higher space-time yields while storing useful heat and useful cold.

The sorbent shaped bodies according to the invention are appropriate for storing useful heat or useful cold. Vaporous materials are expelled from the sorbent shaped body by application of heat energy, and can be condensed where it is appropriate. The materials that were pre-vaporized will be adsorbed in gas phase on corresponding sorbent shaped bodies.

The invention is explained by means of model examples without being limited thereto.

DETAILED DESCRIPTION OF THE INVENTION

Example 1

Figure 1:
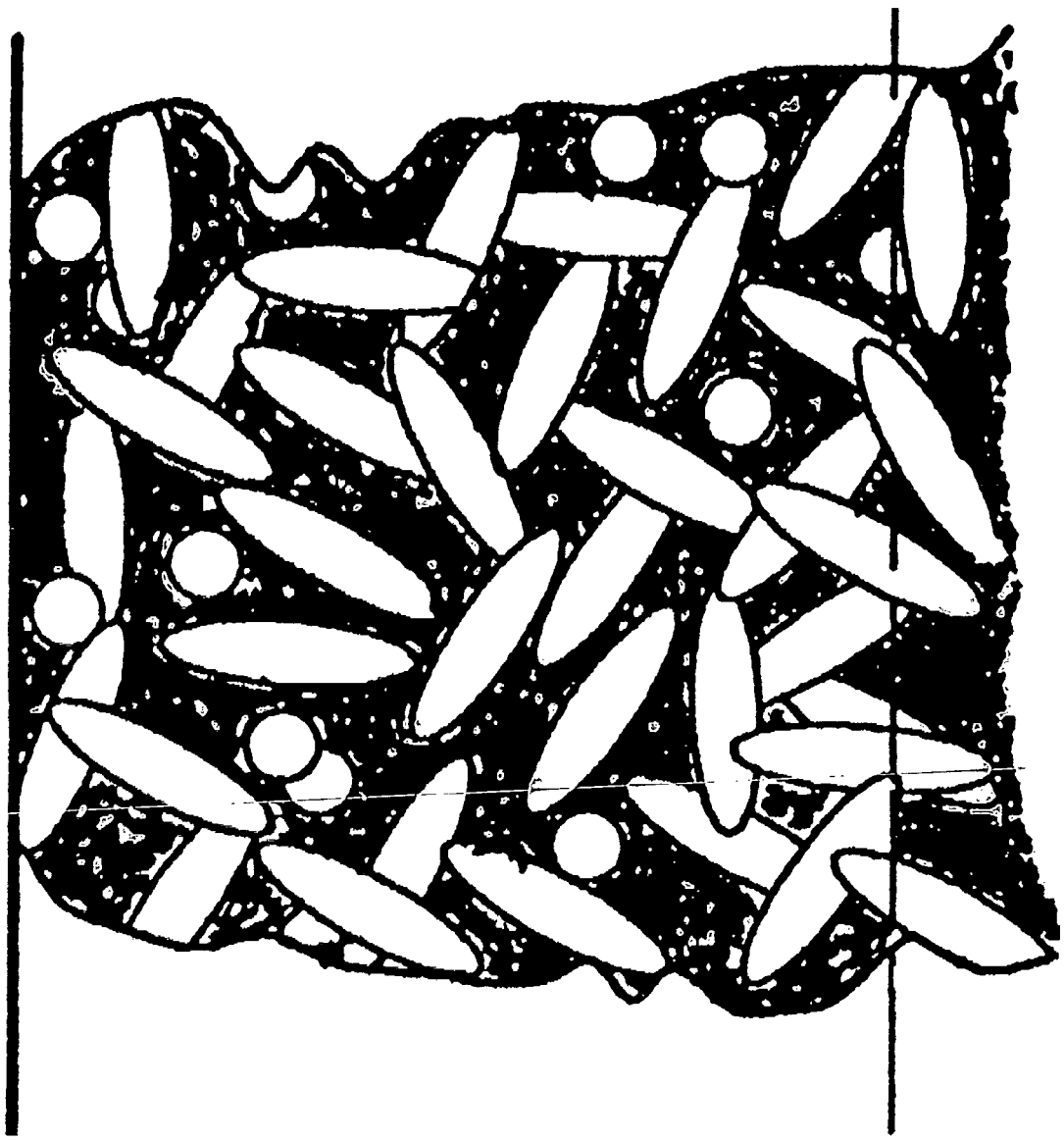
FIG. 1 is a sectional view of a sorbent shaped body according to the state of the art.

Table 1 shows some determined values for the description of the quality of modified sorbents, for example, that of steam loading of the sorbent material, of integral molar heat of adsorption and storage densities compared with those locally available/traditional sorbents. According to the table, it is clear that these values exceed those of non-modified sorbents by about 130 to 200%.

TABLE 1

Characteristic features of modified zeolite sorbents in accordance with the state of the art

| Type of zeolite | Name of zeolite | Producer | Loading [kg/kg] | Integral heat of adsorption [kJ/mol] | Adsorption density [kW/kg] |
|---|---|---|---|---|---|
| NaCaA | Baylith KE 154 | Bayer AG Leverkusen | 0.266 | 76.8 | 0.261 |
| NaX NaA | Zeosorb13 X | Chemie AG Bitterfeld Wolfen modified | 0.231 | 48.4 | 0.199 |
| NaCaA | S 114 P | | 0.291 | 73.4 | 0.342 |
| NaX | PS 107 | | 0.352 | 72.3 | 0.386 |
| NaX | PS 102 F | | 0.316 | 74.0 | 0.352 |
| NaA | S 166 | | 0.294 | 71.0 | 0.310 |

TABLE 2 characteristic features of non-modified and modified sorbent support

| Support | Loading | Integral heat of adsorption [kJ/mol] | Storage density [kg/kg] |
|---|---|---|---|
| Al$_2$O$_3$ | No adsorption | — | — |
| Modified Al$_2$O$_3$ | 0.252 | 60.9 | 0.263 |
| Silica gel | 0.060 | 87.9 | 0.056 |
| Modified Silica gel | 0.530 | 61.2 | 0.632 |
| Aerosil | 0.021 | 9.7 | 0.036 |
| Modified Aerosil | 0.451 | 62.9 | 0.464 |
| WE 894 | 0.245 | 80.2 | 0.359 |
| Modified WE 894 | 0.193 | 83.1 | 0.318 |
| Probe X1 | 0.109 | 65.8 | 0.104 |
| Modified Probe X1 | 0.931 | 57.1 | 0.839 |

Example 2

Analogous to Table 1, different sorbent supports are compared with each other in Table 2. The highest heat storage density is attained by means of some supports. For modified silica gel and modified aerosol this has been achieved through impregnation with hydrated solutions of hydrophilic salts. The values are at least 10 times adjusted in contrast to the corresponding non-modified ones. Even a non-modified aluminium oxide that is usually non-adsorbing becomes steam sorbent in a modified form.

Example 3

Characteristic features of active components of sorbent shaped body of different composition of the zeolite unit cells of group NaA, NaMgA and MgA are shown in Table 3. Steam loading of the sorbent is adjusted for the case of complete exchange of the sodium cations through magnesium cations, which lie above the ultimate attainable values for non-modified zeolite. With the increment of steam sorption capacity, the heat storage density increases proportionally.

TABLE 3

Characteristic features of modified active components of sorbent shaped bodies

| Level of ion exchange [%] | Loading [kg/kg] | Unit cell |
|---|---|---|
| 0 | 0.282 | Na$_{12}$[(AlO$_2$)$_{12}$(SiO$_2$)$_{12}$] |
| 20 | 0.325 | Na$_{9.6}$Mg$_{1.2}$[(AlO$_2$)$_{12}$(SiO$_2$)$_{12}$] |
| 45 | 0.340 | Na$_{6.6}$Mg$_{3.2}$[(AlO$_2$)$_{12}$(SiO$_2$)$_{12}$] |
| 65 | 0.373 | Na$_{4.2}$Mg$_{3.9}$[(AlO$_2$)$_{12}$(SiO$_2$)$_{12}$] |
| 70 | 0.379 | Na$_{3.6}$Mg$_{4.3}$[(AlO$_2$)$_{12}$(SiO$_2$)$_{12}$] |
| 100 | 0.419 | Mg$_6$[(AlO$_2$)$_{12}$(SiO$_2$)$_{12}$] |

Example 4

With Regard to Table 4, the steam sorbing features of a silicate sorbent is represented depending on the Si/Al ratio. For low Si/Al-ratios of the storage material the highest loading, integral heat of adsorption and storage densities have been obtained.

TABLE 4

Characteristic features of silicate storage materials

| Si/Al-ratio | Loading kg/kg | Integral Heat of adsorption kWh/kg |
|---|---|---|
| 11 | 0.581 | 0.468 |
| 15 | 0.584 | 0.401 |
| 25 | 0.354 | 0.239 |
| 30 | 0.371 | 0.260 |
| 40 | 0.322 | 0.217 |
| 50 | 0.302 | 0.195 |
| 70 | 0.215 | 0.176 |
| 100 | 0.154 | 0.169 |

Example 5

The conventional sorbent shaped body 1 in accordance with FIG. 1 is characterized by the existence of an axial and radial uniform distribution of the binding agent 3 between the granules 2 and the additionally inserted heat conducting solid materials (not represented here). In this case, vacuoles 4 can also be developed before or during the hardening process of the binding agent that are interspersed from the vapour forming material. According to the state of the art, these vacuoles 4 are available in low proportion and magnitude, which is actually presently considered a disadvantage. Furthermore, they form only reduced transport pores so that the possible fluidic gap volumes remain limited as a result of a high proportion of binding agent.

Figure 2:
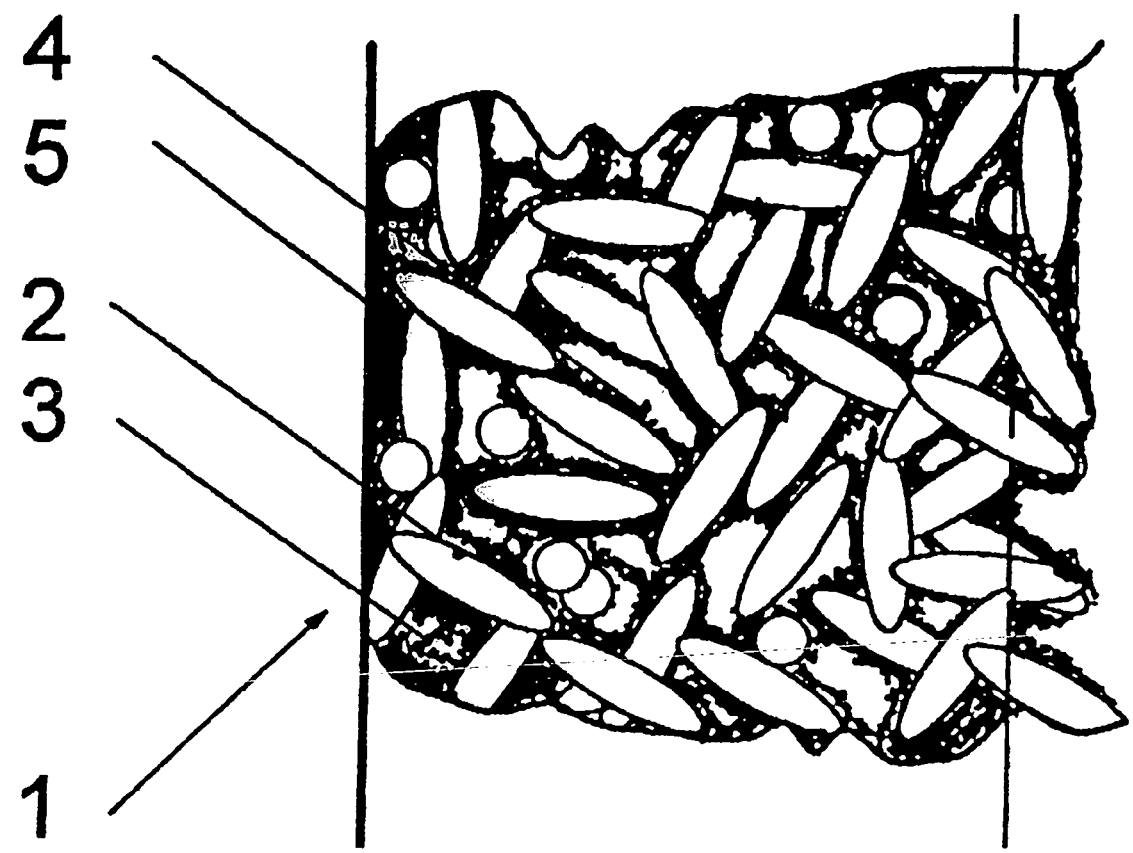
FIG. 2 is a sectional view through a sorbent shaped body in accordance with the invention.
Figure 3:
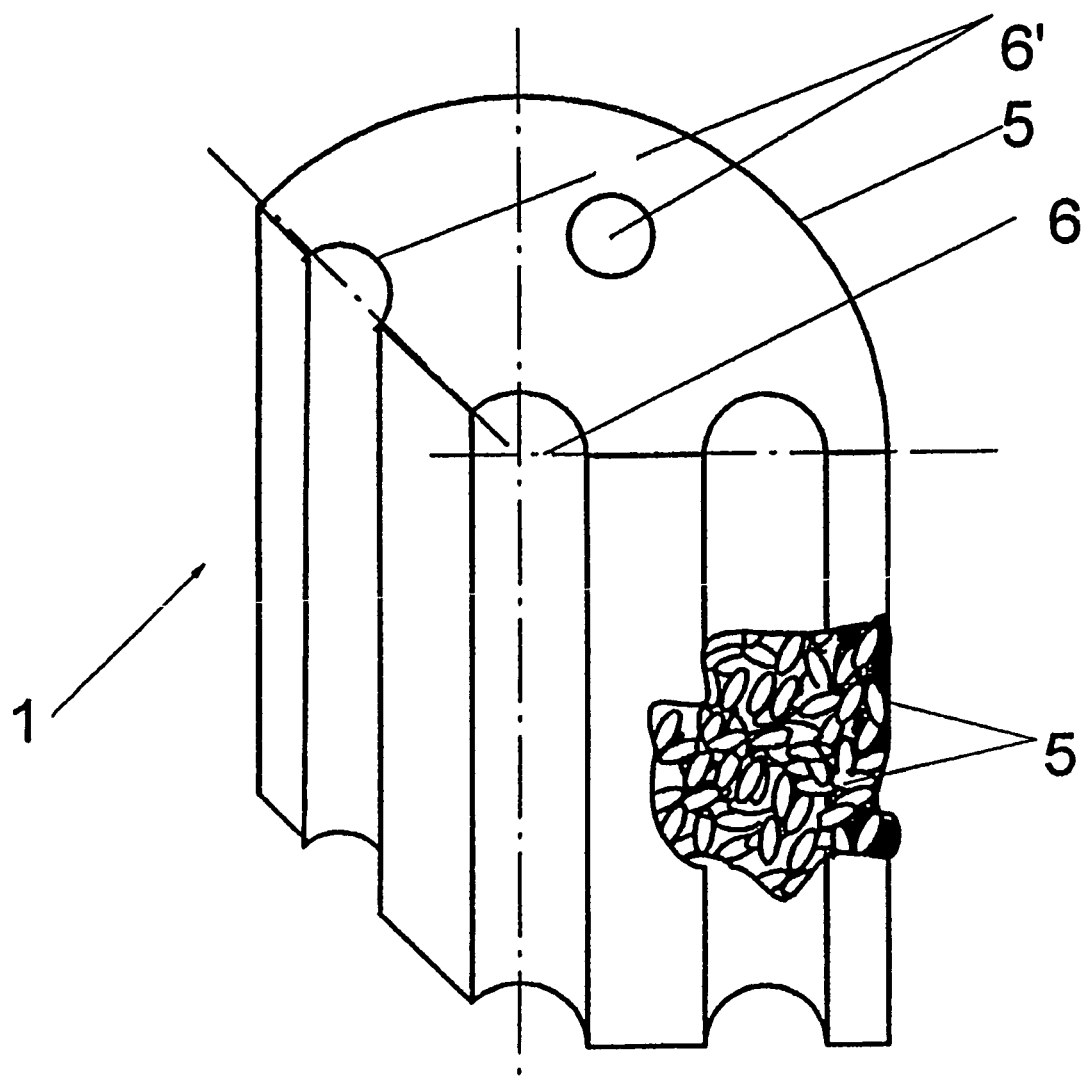
FIG. 3 is a perspective view in partial cross-section of a rotationally symmetrical sorbent shaped body in accordance with FIG. 1b and the inserted fluidic guidance.

The sorbent shaped body 1 of FIG. 2 realizes the corresponding method by concentrating the binding agent 3 in the coating 5 of the sorbent shaped body 1. This results in stabilization and hardening of the coating in the peripheral regions. Concomitantly, in axial neighbouring and central regions of the shaped body 1, a depletion of the binding agent occurs. The binding agent 3 adheres preferentially at the dense adjoined granules and other inserted solid materials as well as in the space. In this way, larger free space around the region, transport pores and free fluidic gap volumes can arise.

The amount of increment of the relative mass of the binding agent is a maximum of 7% by a relative radius of 0.9 (based on the separation between central axis-periphery of the sorbent shaped bodies) and maximum of 4% reduction by a relative radius of 0.1. The pattern of the relative coefficients of resistance and the relative gap volumes (based on the state of the art) shows a lowering of the relative resistance coefficient by a maximum of 6% and the relative gap volumes raise by a maximum of 9% with an increment of the speed by 100%. This trend depends on the cross section related average relative speed of the vaporous material.

| List of reference numerals | |
|---|---|
| 1 | Sorbent shaped body |
| 2 | Granules |
| 3 | Binding agents |
| 4 | Vacuole |
| 5 | Coating |
| 6 | Fluid guidance |
| 6' | Fluid guidance |

The invention claimed is:

1. A shaped body, produced by a process comprising:
   placing at least one solid pre-mixed component onto a porous or perforated support, said at least one solid pre-mixed component including at least one selected from the group consisting of at least one powder and granules;
   adding at least one binding agent to said at least one solid pre-mixed component; and
   pre-solidifying the binding agent accompanied by application of an external force field, said force field resulting in formation of non-uniformly distributed cavities in the form of vacuoles that result in gap volumes between the at least one powder and granules in which a binding agent is distributed non-uniformly in the shaped body, whereby, a proportion of binding agent on the support, which forms a wall of the shaped body, is higher than a proportion of the binding agent that is located inside the shaped body.

2. A shaped body according to claim 1, wherein said external force field is applied through a filtration process, a sedimentation process, a centrifugal process, or a vacuum.

3. A shaped body according to claim 1 or 2, wherein said at least one solid pre-mixed component is an adsorbent component which includes at least one sorbing powder or granules that form a sorbent shaped body.

4. A shaped body according to claim 3, wherein said adsorbent component is a silicate based micro- or meso-porous adsorbent or a composite adsorbent.

5. A shaped body according to claim 4, having a spherical, a cylindrical, or a polyhedron shape.

6. A shaped body according to claim 4, further comprising at least one of:
   a fine fibrous and/or fine dispersed metal component having a size in a millimeter range that is greater than the size of a silicate crystal of the sorbing powder or granules;
   high heat conducting materials having a size greater than the size of the sorbing powder or granules; and
   a wetting agent.

7. A shaped body according to claim 3, having a spherical, a cylindrical, or a polyhedron shape.

8. A shaped body according to claim 3, further comprising at least one of:
   a fine fibrous and/or fine dispersed metal component having a size in a millimeter range that is greater than the size of a silicate crystal of the sorbing powder or granules;
   high heat conducting materials having a size greater than the size of the sorbing powder or granules; and
   a wetting agent.

9. A shaped body according to claim 3, wherein said binding agent is silicate pre-polymerized binding agent.

10. A shaped body according to claim 9, wherein said binding agent includes water glass.

11. A shaped body according to claim 3, wherein said adsorbent component includes at least one of an unmodified alumosilicate with a Si/Al ratio of at least 1 up to 4 and a mesoporous alumosilicate with a Si/Al ratio of 15 to 30.

12. A shaped body according to claim 11, wherein said alumosilicate is obtained from modified zeolite with an average of pore radius below 7.2 nm through cation exchange, and the exchanged cations are selected from doubly positively charged ions and Na-ions.

13. A shaped body according to claim 1, further comprising a composite adsorbent having finely dispersed hydrophilic salts placed into pores and cavities of the composite adsorbent.

14. A shaped body according to claim 1, further comprising fluidic guidance that is inserted into the shaped body.

15. A shaped body according to claim 14, wherein said fluidic guidance comprises a one of a metallic net and metallic grating.

16. A shaped body, comprising:
   a formed mass including at least one solid pre-mixed component comprised of at least one powder or granules and a binding agent holding said at least one powder or granules together, said mass having non-uniformly distributed cavities in the form of vacuoles that result in gap volumes in which the binding agent is distributed non-uniformly.

17. A shaped body according to claim 16, wherein said at least one solid pre-mixed component is an adsorbent component which includes at least one sorbing powder or granules that form a sorbent shaped body.

18. A method of producing the shaped body of claim 16, comprising:
   placing the binding agent in the form of a fluid or paste and the at least one solid pre-mixed component into a hollow tube of a tool which exhibits a porous and/or perforated wall in a force field direction as support for the solid pre-mixed component to form the formed mass; and
   processing the formed mass by the action of the force field by attaining a density stratification of the binding agent.

19. The method according to claim 18, further comprising partially removing a portion of the binding agent through the wall during the processing step.

20. The method according to claim 18, wherein the processing step is carried out through thermal effect that results in pre-solidification of the formed mass.

21. The method according to claim 20, wherein temperature due to the thermal effect is below 200° C.

22. The method according to claim 21, wherein the temperature is 150° C. or less.

23. The method according to claim 18, further comprising applying subsequent thermal treatment to the formed mass after removing it from the hollow tube.

24. The method according to claim 23, wherein temperature due to the thermal treatment is below 200° C.

25. The method according to claim 24, wherein the temperature is 150° C. or less.

26. The method according to claim 18, wherein the action of the force field is one of a filtration process, a filtering centrifugal process, a sedimentation process and a vacuum process.

27. The method according to claim 18, wherein acids or bases are used to aid pre-solidifying of the binding agent in the processing step.

28. The method according to claim 18, wherein a grating or basing in a form of a net is placed onto the porous and/or perforated wall.

29. The method according to claim 28, wherein the grating or basing includes metallic knitted fabrics, tresses, fleeces, fibrous web or clutch.

30. The method according to claim 18 or 19, further comprising adding to the binding agent and at least one solid pre-mixed component in the hollow tube conductive solid materials selected from thin fibrous and finely dispersed metal components having powder dimensions in a sub-millimeter size range.

31. The method according to claim 18 or 19, further comprising adding to the binding agent and at least one solid pre-mixed component in the hollow tube at least one of deformed stripes, fibrous or film components of metals or other heat conducting materials having a dimension in at least a millimeter range, the dimension being above a corresponding dimension of granules of the least one solid pre-mixed component.

* * * * *